Feb. 24, 1931.   E. L. HOFFMAN   1,793,933
PROPELLER AND ENGINE ARRANGEMENT FOR AIRCRAFT
Filed June 14, 1928   2 Sheets-Sheet 2
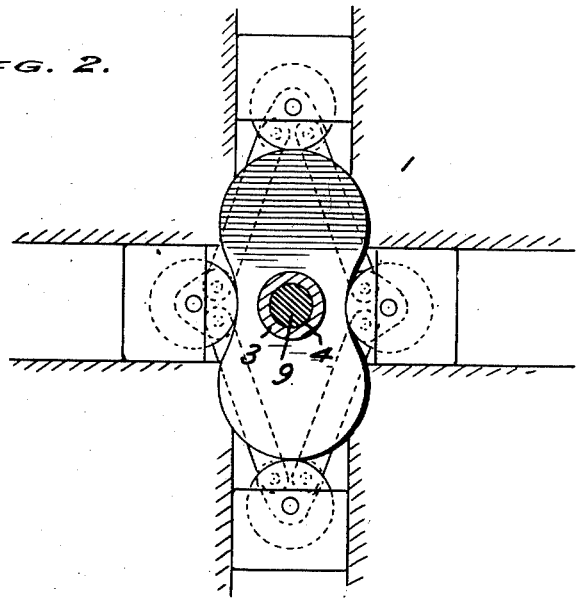
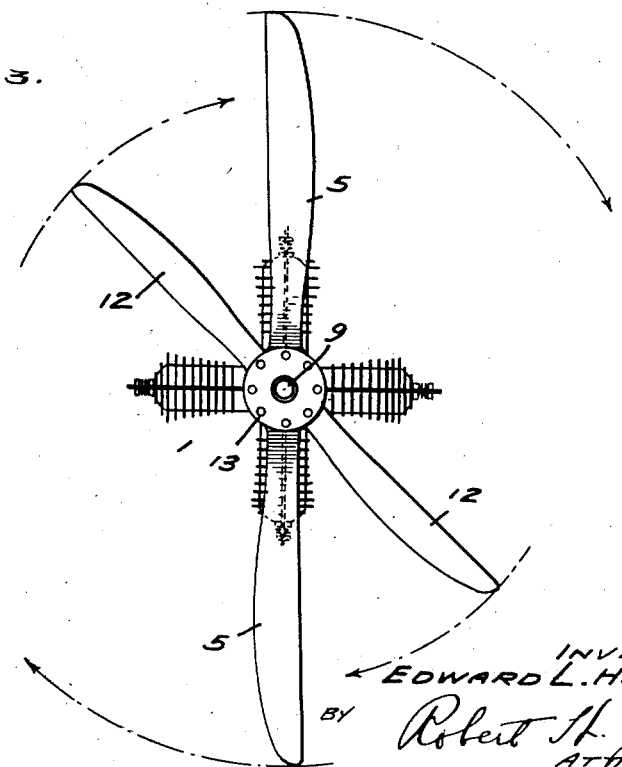
INVENTOR
EDWARD L. HOFFMAN
BY Robert H. Young
ATTORNEY Patented Feb. 24, 1931

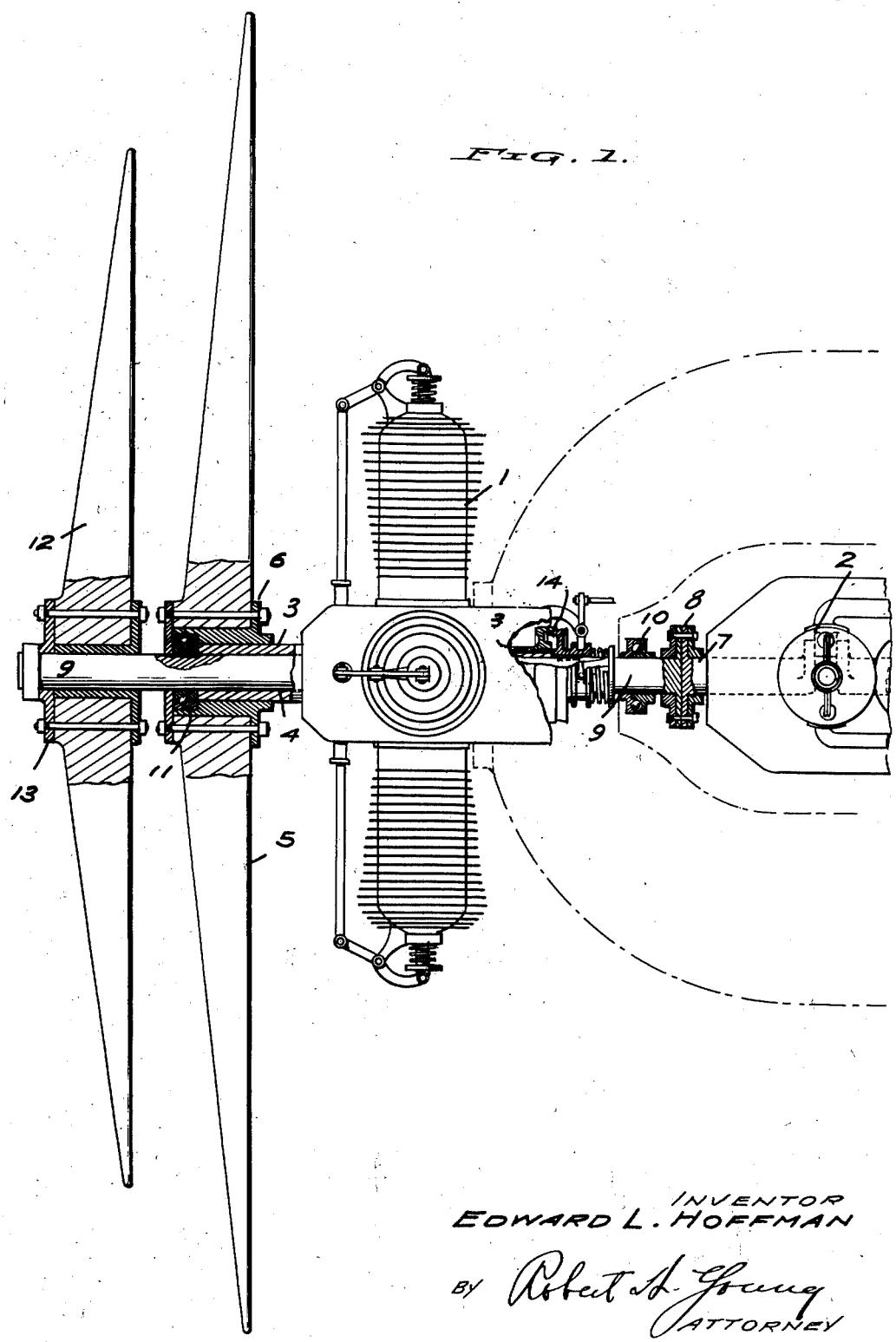

1,793,933

UNITED STATES PATENT OFFICE

EDWARD L. HOFFMAN, OF FORT SLOCUM, NEW YORK

PROPELLER AND ENGINE ARRANGEMENT FOR AIRCRAFT

Application filed June 14, 1928. Serial No. 285,475.

This invention relates to internal combustion engines, but more particularly to aircraft engines, and the invention has for its object to provide for the driving of a propeller and shaft of one engine through a hollow engine shaft of another engine, so as to mount the two propellers concentrically, to the end that the stopping of either propeller in the air will not unbalance the aircraft.

With this object in view, the invention consists of the novel construction and arrangement of the engine shaft of an engine, so that an engine arranged in tandem therewith may drive a propeller shaft through the engine shaft of the former and independently thereof in such manner that either of the engines may be run selectively or simultaneously.

The invention further consists of certain details of construction and combinations of parts, all of which will be first fully described and afterwards specifically pointed out in the appended claims.

Referring to the accompanying drawings:

Fig. 1 is a diagrammatic view of the two engines arranged in tandem, and illustrating the application of the invention, Fig. 2 is a diagrammatic sectional view through the engine shaft of the forward engine and the propeller shaft of the aft engine, and Fig. 3 is a front elevation of the assembly.

Like numerals of reference indicate the same parts throughout the several figures, in which:

1 indicates the forward engine, and 2 the aft engine, the former being of the cam or other type in which the engine shaft is devoid of cranks, while the latter may be of any type.

The forward engine 1 has preferably a cam type engine shaft 3 provided with a hole 4 longitudinally through the same from end to end, and at the forward end of said shaft, the propeller 5 is mounted in any suitable manner, by any suitable propeller mounting 6.

Connected to the engine shaft 7 of the aft engine 2 is a flexible coupling 8, to which is also connected a propeller shaft 9 running in a combined axial and thrust bearing 10 and passing through the hollow engine shaft 4 of the forward engine 1, and through the radial bearing 11 mounted in the propeller 5. On the end of the propeller shaft 9, and forward of the propeller 5, the forward propeller 12 is mounted by any suitable mounting 13.

It is preferable that the two engines 1 and 2 be of such relative power that the two propellers 5 and 12 be of different diameters and pitches, and that the forward propeller 12 be of smaller diameter than that of the aft propeller 5.

Disposed between the two engines and so connected to the propeller shaft 9 and hollow engine shaft 3, that the rotation of one may be imparted to the other, is an over-running clutch 14 which may be actuated at the will of the pilot.

Having thus described the invention, the operation of the same will be evident to those skilled in the art, and while I have shown and described one example of the invention, I do not wish to be understood as limiting myself to the exact construction disclosed, as various changes and modifications may be made therein without departing from the spirit of this invention, and I consider myself clearly entitled to all such changes and modifications that fall within the limit and scope of the appended claims.

I claim:

1. A device of the character described, including a pair of engines arranged in tandem, the engine shaft of one engine having a hole longitudinally through the same from end to end, a propeller on said shaft, a propeller shaft for the other engine, a flexible coupling for connecting said propeller shaft to the engine shaft of the last mentioned engine, the said propeller shaft passing through the hole in the engine shaft of the first mentioned engine, a propeller on the propeller shaft beyond the first mentioned propeller, a bearing for the propeller shaft at the first mentioned propeller, an axial and thrust bearing for the propeller shaft between the two engines, and a clutch for releasably connecting the propeller shaft with the engine shaft of the first mentioned engine.

2. A device of the character described including a pair of engines arranged in tandem, the engine shaft of one engine having a hole longitudinally through the same from end to end, a propeller on said shaft, a propeller shaft for the other engine, the said propeller shaft passing through the hole in the engine shaft of the first mentioned engine, a propeller on the propeller shaft beyond the first mentioned propeller, a bearing for the propeller shaft near the outer end thereof, an axial and thrust bearing for the propeller shaft near the inner end thereof, and a clutch for releasably connecting the propeller shaft with the engine shaft of the first mentioned engine.

3. A device of the character described including a pair of engines in tandem, the engine shaft of one engine having a hole longitudinally through the same from end to end, a propeller on said shaft, a propeller shaft for the other engine passing through the hole in the engine shaft of the first mentioned engine, a propeller on the propeller shaft beyond the first mentioned propeller, an axial and thrust bearing for the device, and a clutch for releasably connecting the propeller shaft with the engine shaft of the mentioned engine.

4. A device of the character described including a pair of engines arranged in tandem, the engine shaft of one engine having a hole longitudinally through the same from end to end, a propeller on said shaft, a propeller shaft for the other engine passing through the hole in the engine shaft of the first mentioned engine, a propeller on the propeller shaft beyond the first mentioned propeller and a clutch for releasably connecting the propeller shaft with the engine shaft of the forward engine.

5. A device of the character described including a pair of engines arranged in tandem, the engine shaft of one engine having a hole longitudinally through the same from end to end, a propeller for said shaft, a propeller shaft for the other engine passing through the hole in the engine shaft of the first mentioned engine, a propeller for the propeller shaft beyond the first mentioned propeller, and means for releasably connecting the propeller shaft with the engine shaft of the first mentioned engine.

In testimony whereof I affix my signature.

EDWARD L. HOFFMAN.